3,147,128
FOAMED MAGNESIUM OXYSULFATE CEMENT AND PROCESS

Bob R. Harrell, Lake Jackson, Tex., assignor to The Dow Chemical Company, Midland, Mich., a corporation of Delaware
No Drawing. Filed Dec. 4, 1961, Ser. No. 156,928
5 Claims. (Cl. 106—105)

This invention pertains to foamed magnesium oxysulfate cement. More particularly, it pertains to a magnesium oxysulfate cement which has been stabilized to keep the foam from collapsing prior to setting.

Magnesium oxysulfate and magnesium oxychloride cements have been known for a number of years. In the last five years considerable interest has developed in the foamed magnesium type cements. In foaming these cements, magnesium oxide and magnesium chloride or magnesium sulfate are added to water to form a slurry. The slurry is then agitated or intermixed with air or another gas to obtain a foamed product. The foamed material is molded and allowed to set which requires a certain amount of time for the material to undergo reaction to solidify.

Although the magnesium oxysulfate cement may be readily foamed by the various known methods, the foam is not stable and will not hold its shape long enough for the foam to set. Very shortly after foaming, the foam begins to collapse. Thus when the foam is molded the foam will not maintain its shape but will settle and partially collapse before the cement can harden.

It is therefore an object of this invention to provide a composition of a foamed magnesium oxysulfate cement which is stabilized and will not settle or appreciably collapse in the time required for the cement to set or harden. A further object is to provide a process for stabilizing foamed magnesium oxysulfate cement.

The above and other objects are attained according to the invention by intermixing from 0.1 to 1 weight percent, based upon the total weight of the slurry, of magnesium chloride in the slurry prior to foaming of the slurry. By the addition of this surprisingly small amount of magnesium chloride, a magnesium oxysulfate foamed product is obtained which is stabilized against collapsing and settling. After foaming it can be molded and it will maintain its shape without any appreciable settling or collapsing until the product has set or hardened. A uniform product of low density foamed magnesium oxysulfate may thus be obtained.

In preparing the stabilized magnesium sulfate the various known methods may be used. A slurry containing generally from 25 to 40 percent magnesium oxide, 11 to 15 percent magnesium sulfate and the balance water is generally used. The slurry may be agitated, such as by mixing, to aerate the slurry and thus form the foam. A gas foaming agent which upon addition to the slurry will result in the release of gas and thus foaming may also be used. Preferably, the foaming is effected mechanically by use of an appropriate mixer.

To aid in the foaming a surfactant or wetting agent may be added. The agents used generally fall in the category of non-ionic wetting agents. Illustrative examples of some of these agents are an alkyl aryl polyether alcohol, such as "Triton NE," and a polyglycol ether such as "Antarax A-280." Non-ionic wetting agents made by hydrolysis of vegetable protein may also be used. Examples of such agents are: hydrolyzed soybean protein, such as "Fomon PB2" and a hydrolyzed enzyme degraded vegetable protein such as "Airfoam." The non-ionic surfactants are generally insensitive to electrolytes such as magnesium sulfate in the slurry. The foaming agent is generally added in an amount of from about ½ to 1½ weight percent.

The magnesium chloride added to stabilize the foam may be added at any time prior to foaming. Generally a solution containing in the range of 15 to 25 percent magnesium sulfate is intermixed with the required amount of magnesium oxide. At this time an aqueous solution of magnesium chloride is added with the desired amount of the surfactant to obtain a slurry having a composition in the range given above. The slurry is agitated to intermix the ingredients after which it may be more violently mixed to effect the foaming or other known apparatus used employing controlled mixing to effect the foam such as described in patent applicant Serial No. 156,652, dated December 4, 1961, in which the inventor of the instant application is a co-inventor. After foaming, the magnesium sulfate cement is placed in a mold or where desired and allowed to set or harden. Generally in from 5 to 16 hours it sets sufficiently so that it can be handled. However, it may take from 2 to 7 days before the product will attain most of its strength. By stabilizing the foam, it is possible to produce a low density foam in the range of 5 to 10 pounds per cubic foot. These light weight foams are used for many agricultural purposes, such as ground cover and frost protection. The sulfate foams are stable against natural physical or chemical attacks but may be easily destroyed or dispersed in such a manner that it would not affect further future operations.

Only a small amount of magnesium chloride has to be added to stabilize the magnesium foams from collapsing and settling. Generally the amount of magnesium chloride used is in the range of 0.1 to 1 percent of the total weight of the other ingredients present in the slurry. The optimum amount of magnesium chloride used varies with the amount of solids present in the slurry. When a thicker slurry is used, less magnesium chloride is necessary. In slurries normally used for foaming, from 0.4 to 0.6 weight percent of magnesium chloride is generally preferred.

To illustrate the stabilizing effect obtained by using a small amount of magnesium chloride, a slurry was prepared by mixing magnesium oxide, a 19 weight percent magnesium sulfate solution a 34 weight percent magnesium chloride solution, and a surfactant sold by the American-Le France-Foamite Corporation under the trade name "Airfoam" in proportions such as to obtain a mixture containing 29.8 percent magnesium oxide, 13 weight percent magnesium sulfate, 0.2 percent magnesium chloride, 0.8 percent Airfoam, and the balance water. After intermixing the ingredients, the slurry was foamed by intermixing the slurry with air. After foaming the product, the product was placed in a square mold of 4½ inches thick and allowed to set. The product hardened in about 10 hours to form a rigid white colored foam having a density of 6 pounds per cubic foot which remained substantially 4½ inches in thickness. Upon cutting the foam, the size and the distribution of the voids throughout the product was substantially uniform.

The above procedure was followed in preparing a foam in the like manner with the exception that no magnesium chloride was added to the slurry prior to foaming. The foam obtained when placed in the square mold of 4½ inches thick, settled to a height of 1¼ inches before it had hardened. It had a density of 26 pounds per cubic foot. Upon cutting the foam product, the size and distribution of the voids were not uniform. The voids at the bottom of the product were smaller and more compressed due to the settling obtained during the setting time.

What is claimed is:
1. A foamed magnesium oxysulfate cement, which con- sists essentially of from 25 to 40 weight percent of magnesium oxide, 11 to 15 weight percent of magnesium sulfate, 0.5 to 1.5 weight percent of a non-ionic wetting agent, from 0.1 to 1 weight percent of magnesium chloride, and the balance water of hydration.

2. A foamed oxysulfate cement according to claim 1 having a density in the range of 5 to 10 pounds per cubic foot.

3. A foamed oxysulfate cement according to claim 2 wherein the magnesium chloride content is in the range of 0.4 to 0.6 weight percent.

4. A process for the preparation of a foamed magnesium oxysulfate cement, which comprises intermixing magnesium oxide, a magnesium chloride solution, a magnesium sulfate solution, and a non-ionic wetting agent in water in proportions such that the resulting mixture contains from 25 to 40 weight percent of magnesium oxide, 11 to 15 weight percent of magnesium sulfate, 0.5 to 1.5 weight percent of the wetting agent, from 0.1 to 1 weight percent of magnesium chloride, and the balance water, mixing the slurry to entrap gas bubbles in the slurry to form a foamed product, and confining the foamed material in a given space until the foamed cement has set.

5. A process according to claim 4 wherein from 0.4 to 0.6 weight percent of magnesium chloride is intermixed with the slurry.

References Cited in the file of this patent
UNITED STATES PATENTS

| | | |
|---|---|---|
| 100,945 | Sorel | Mar. 15, 1870 |
| 1,838,147 | Lukens et al. | Dec. 29, 1931 |
| 1,853,522 | Stewart | Apr. 12, 1932 |
| 2,598,981 | Denning | June 3, 1952 |
| 2,702,753 | Dickey | Feb. 22, 1955 |
| 2,717,841 | Biefeld et al. | Sept. 13, 1955 |